(12) United States Patent
Stahl

(10) Patent No.: US 8,950,149 B2
(45) Date of Patent: Feb. 10, 2015

(54) CONCRETE STRUCTURE

(75) Inventor: Michael Stahl, Reichshof (DE)

(73) Assignee: Droessler GmbH Umwelttechnik, Siecen (DE)

( * ) Notice: Subject to any disclaimer, the term of this patent is extended or adjusted under 35 U.S.C. 154(b) by 0 days.

(21) Appl. No.: 13/982,355

(22) PCT Filed: Jan. 19, 2012

(86) PCT No.: PCT/EP2012/000229
§ 371 (c)(1),
(2), (4) Date: Aug. 16, 2013

(87) PCT Pub. No.: WO2012/110189
PCT Pub. Date: Aug. 23, 2012

(65) Prior Publication Data
US 2013/0312358 A1  Nov. 28, 2013

(30) Foreign Application Priority Data
Feb. 16, 2011 (DE) .......................... 10 2011 011 414

(51) Int. Cl.
| E04B 1/61 | (2006.01) |
| E04C 2/04 | (2006.01) |
| E04B 1/04 | (2006.01) |
| E04H 7/18 | (2006.01) |
| E04H 7/28 | (2006.01) |
| E04H 12/12 | (2006.01) |
| E04C 2/38 | (2006.01) |

(52) U.S. Cl.
CPC . *E04C 2/04* (2013.01); *E04B 1/043* (2013.01); *E04H 7/18* (2013.01); *E04H 7/28* (2013.01); *E04H 12/12* (2013.01); *E04C 2/38* (2013.01); *Y02E 10/728* (2013.01)
USPC ........... 52/592.2; 52/591.3; 52/592.3; 52/605

(58) Field of Classification Search
CPC ..... E04B 1/61; E04B 2/18; E04B 2002/0204; E04B 1/6104; E04B 2001/6195; E02D 29/025
USPC ............... 52/605, 591.1, 591.2, 591.3, 592.1, 52/592.2, 592.3
See application file for complete search history.

(56) References Cited

U.S. PATENT DOCUMENTS

| 2,290,369 A * | 7/1942 | Fleischmann .................... 52/574 |
| 3,170,201 A * | 2/1965 | Nofziger .......................... 52/844 |
| 6,205,735 B1 * | 3/2001 | Witcher ........................... 52/604 |
| 6,508,041 B1 * | 1/2003 | Boot ............................... 52/578 |
| 2013/0312358 A1 * | 11/2013 | Stahl ............................... 52/604 |

* cited by examiner

FOREIGN PATENT DOCUMENTS

| DE | 9318930 U | 4/1994 |
| DE | 20319471 U | 2/2005 |
| GB | 560861 B | 4/1944 |

*Primary Examiner* — Andrew J Triggs
(74) *Attorney, Agent, or Firm* — Andrew Wilford

(57) ABSTRACT

In a concrete structure, consisting of at least two upright precast concrete elements (1, 1'), it is intended to develop the butt joints between the precast concrete elements in such a way that forces can be absorbed better in at least two directions. For this purpose, it is proposed that at least two tongue-and-groove connections (4, 9; 5, 10) are provided in the region of at least one butt joint (2, 2') between the precast concrete elements (1, 1'), wherein one of the tongue-and-groove connections (4, 9) is arranged such that it is turned with respect to the second tongue-and-groove connection (5, 10) in a range between about 1° and about 179°, and wherein the butt joint (2, 2') is of an offset form, and the tongue-and-groove connections (4, 9; 5, 10) are provided in the regions of the offset that run substantially parallel to the surface (3) of the precast concrete elements (1).

5 Claims, 5 Drawing Sheets

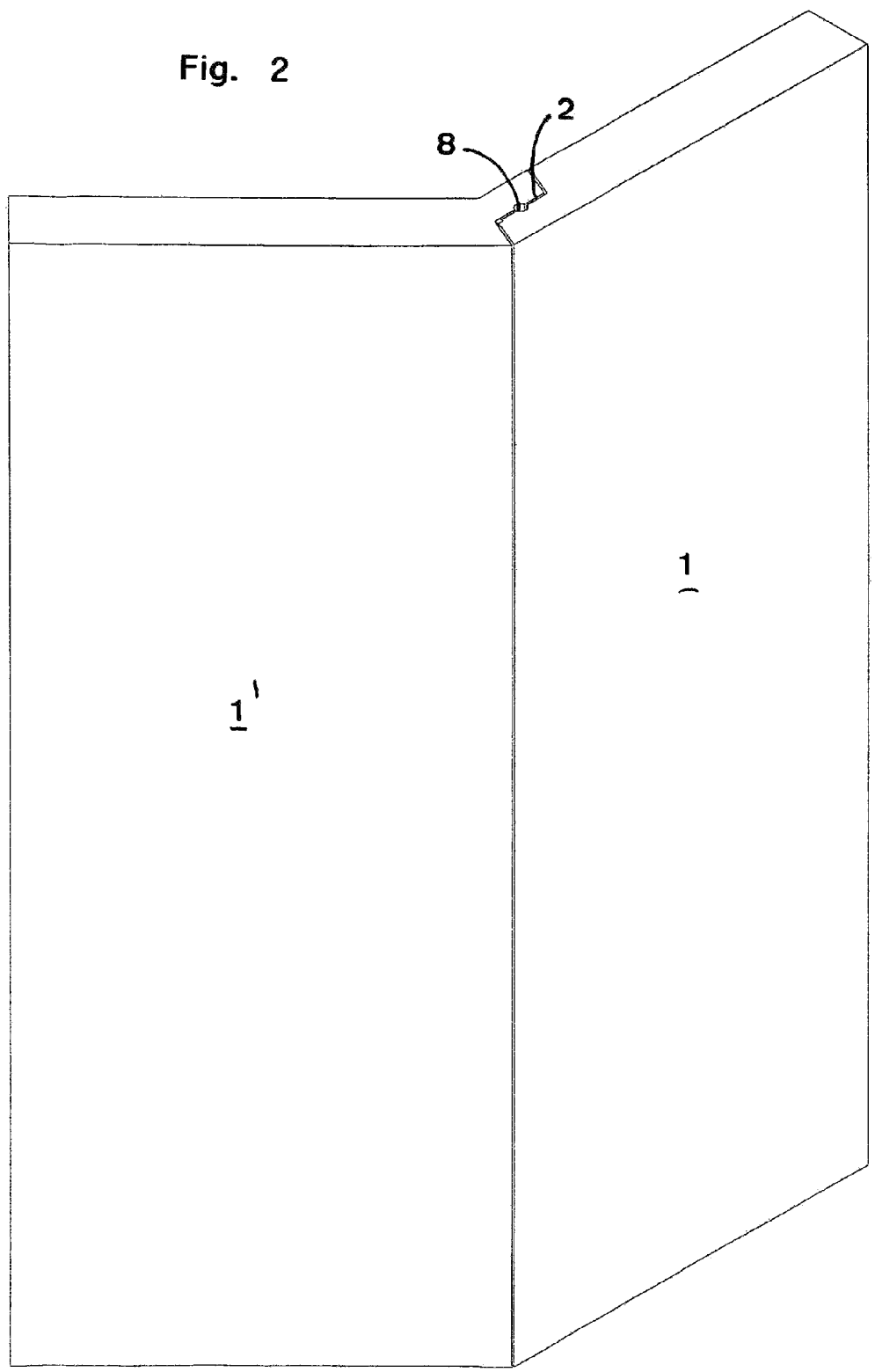

CONCRETE STRUCTURE

CROSS REFERENCE TO RELATED APPLICATIONS

This application is the US-national stage of PCT application PCT/EP2012/000229 filed 19 Jan. 2012 and claiming the priority of German patent application 102011011414.9 itself filed 16 Feb. 2011.

FIELD OF THE INVENTION

The invention relates to a concrete structure composed of at least two upright precast concrete elements.

BACKGROUND OF THE INVENTION

Precast concrete elements of this type typically are of a plate-like shape and are employed for example in the construction of large tanks or the construction of towers for wind turbines. In order to be able to transmit loads between the individual precast concrete elements, these elements are joined by fresh concrete. However, the loads are essentially accommodated by tensioning cables that connect the precast concrete elements.

The joints of relatively large concrete structures typically create weak points in terms of the transmission of loads. DE 93 18 930 has therefore already proposed an approach whereby longitudinally oriented tongue-and-groove joints are provided at the joints. However, this only allows loads to be accommodated in one axis. The use of eye-bolts and reinforcing bars threaded through them enables loads to be accommodated in a second axis. The action of threading in the reinforcing bars is difficult and time-consuming, however, due to the required alignment of the eye-bolts DE 203 19 471 discloses a connecting joint between two precast concrete components that has at least two recessed grooves each which is disposed bilaterally adjacent, into which the jointing material can be introduced. By this approach, loads could be accommodated in one axis only after the jointing material has set. However, DE 203 19 471 discloses other interlocking elements that provide a secure fastening in a second axis as soon as the precast concrete components are joined. DE 203 19 471 also describes loops in the grooves that function to accommodate the reinforcing bars. In principle, loads can thus be accommodated in the third axis. Here too, however, a reliable accommodation of loads is possible only after the jointing material has set due to the flexible nature of the loops. During assembly, the precast concrete components must be continuously supported by costly means until the jointing material that joins the precast concrete components has set.

OBJECT OF THE INVENTION

The object of the invention is to develop the joints between precast concrete elements so as to enable loads to be better accommodated in at least two axes as soon as the precast concrete elements are assembled.

SUMMARY OF THE INVENTION

In order to achieve this object, the invention proposes an approach whereby at least two tongue-and-groove joints are provided at at least one joint between the precast concrete elements, one of the tongue-and-groove joints being rotated relative to the second tongue-and-groove joint in a range between approximately 1° and 179°, the joint being of an offset form, and the tongue-and-groove joints being provided at the offset that runs essentially parallel to the surface of the precast concrete elements.

The fact that for example one tongue-and-groove joint is vertical and the second tongue-and-groove joint is rotated at the same joint by a predetermined amount from the orientation of the first tongue-and-groove joint enables loads to be optimally accommodated in two axes. Providing the joint in offset form additionally also enables loads to be accommodated in a third axis. As a result, compressive or tensile loads between the precast concrete elements, as well as vertical and horizontal loads is perpendicular to the tensile loads can all be accommodated.

An advantageous aspect is that the tongue-and-groove joints are rotated by approximately 45° and/or approximately 90°. Rotation by 90° allows for example vertical and horizontal loads to be accommodated.

An advantageous aspect is that the precast concrete elements are provided with tongues and/or grooves on at least two of their opposite edges, and that the tongues and grooves of the one edge of the precast concrete element are correspondingly matched by grooves and tongues on the opposite edge of the precast concrete element.

This arrangement of the tongues and grooves consistently enables identical precast concrete elements to be easily joined, yet also allows loads to be optimally accommodated in all axes at the joints.

An exemplary aspect is that each precast concrete element is provided on its one edge with tongues and on the opposite edge with grooves.

The precast concrete elements can be assembled more easily by providing mechanical connections, preferably, bolt connections, at the offset that runs essentially parallel to the surface of the precast concrete elements.

These bolt connections combined with the tongue-and-groove joints can be sufficient in small concrete structures to handle the loads that occur. However, the tongue-and-groove joints and the bolt connections typically function to relieve the load on the tension cables and to more uniformly distribute loads within the concrete structure.

An advantageous aspect is that the tongue-and-groove joints are adhesively bonded. As one version of adhesive bonding, it is proposed that the tongue-and-groove joint be bonded by grout.

It is, however, also possible to create the tongue-and-groove joint as a butt joint.

BRIEF DESCRIPTION OF THE DRAWING

The following discussion describes the invention based on a drawing. Therein:

FIG. 2 shows the assembled precast concrete elements of FIGS. 1a and 1b;

SPECIFIC DESCRIPTION OF THE INVENTION

Figure 1A:
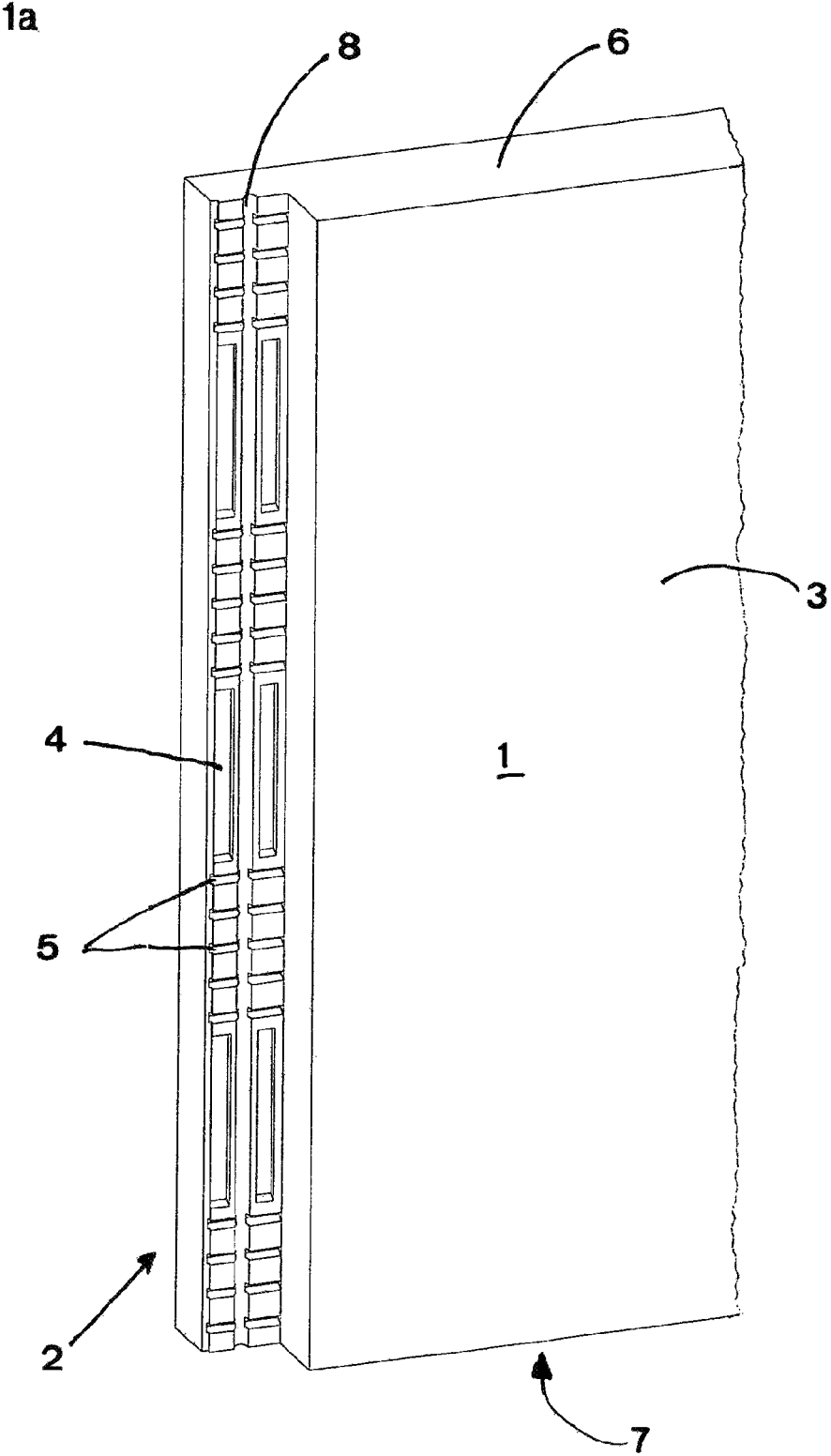
FIG. 1a is a partial view of a precast concrete element with a groove in the joint.

FIG. 1a is a view of part of a precast concrete element 1 comprising a joint edge 2 that is offset as shown in a top view. The region shown as parallel to a face 3 of the precast concrete element 1 includes vertical grooves 4 and horizontal grooves

5. The grooves are essentially rotated 90° relative to each other. The grooves are symmetrical, in two rows here, relative to a top edge 6 and a bottom edge 7, a semicircular groove 8 being provided between the two rows that will subsequently form part of an injection channel for grout.

Figure 1B:
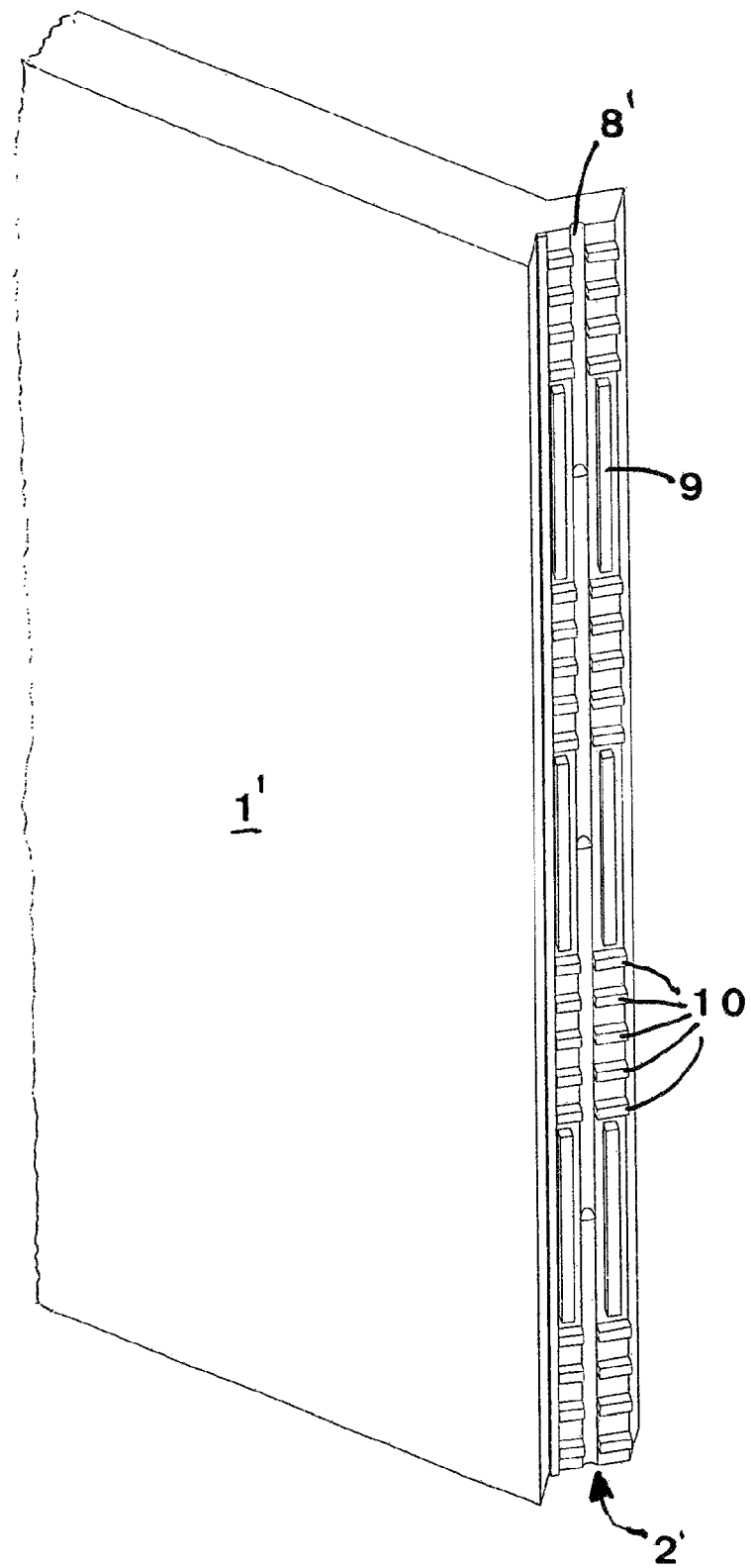
FIG. 1b is a partial precast concrete element with tongues at the joint.

FIG. 1b shows a corresponding complementary edge of precast concrete element 1' where vertical tongues 9 and horizontal tongues 10 are illustrated at the offset. The precast concrete element 1' itself is shown to be angled at the offset, thereby enabling for example a polygonal concrete structure to be created, such as, for example, a polygonal wind turbine tower.

FIG. 2 shows the assembled precast concrete elements 1 and 1'. The fitted-together grooves 4, 5, and tongues 9, 10 enable the joint to accommodate tensile loads and compressive loads both in the X axis and Y axis. The offset functions to accommodate corresponding loads in the Z axis.

Figure 3:
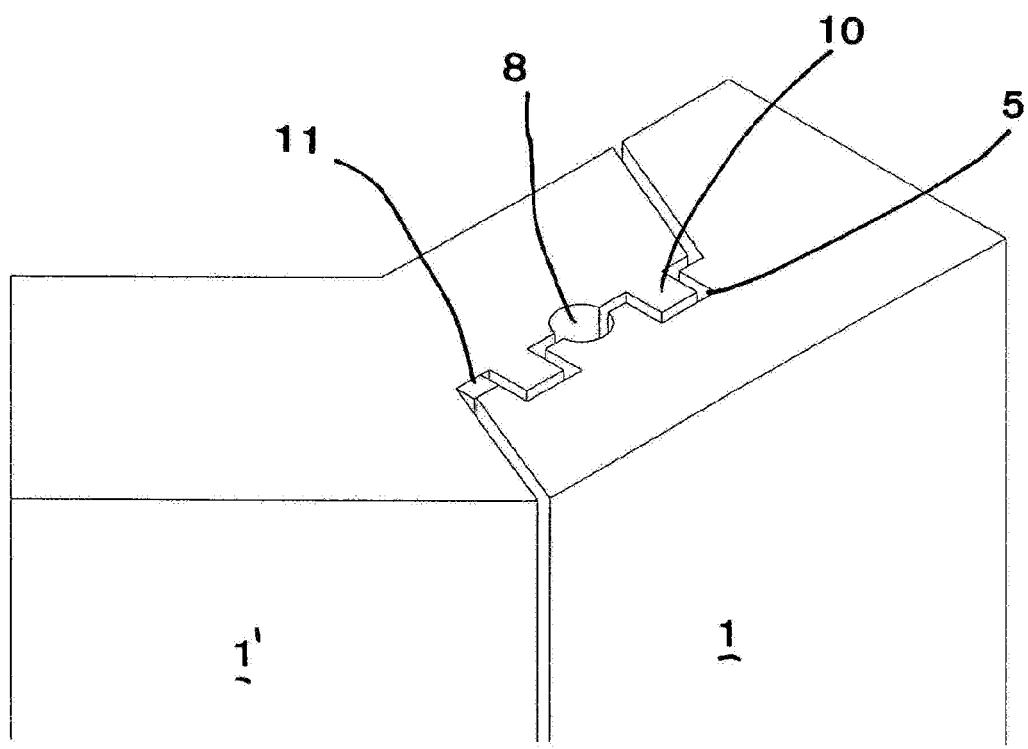
FIG. 3 is a detail of an offset joint.

FIG. 3 is an enlarged detail of the joint between precast concrete elements 1 and 1'. It shows both horizontal tongues 10 and horizontal grooves 5. The two semicircular grooves 8 of the precast concrete elements 1 and 1' form an injection channel through which fresh concrete or grout can be introduced into the joint between the precast concrete elements. FIG. 3 shows a sealing lip 11 that functions to prevent fresh concrete from escaping laterally from the joints. It is possible to provide a seal for example at the inner wall of the precast concrete elements by means of an adhesive strip that is installed before the grout is introduced.

Figure 4:
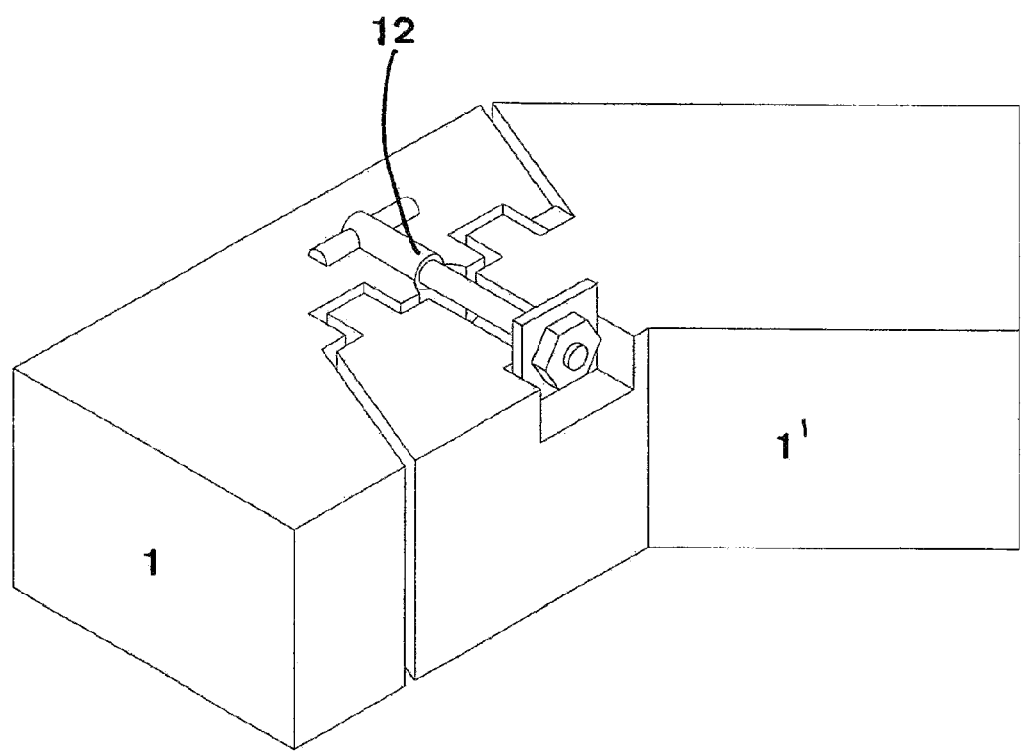
FIG. 4 is a detail of a butt joint with connecting elements.

FIG. 4 illustrates that a bolt connection 12 is provided at the joint that is illustrated with an offset, which connection both ensures the cohesive attachment of precast concrete elements 1, 1' when they are assembled and which also continues to impart strength to the connection after the joints have been filled with grout.

The invention claimed is:

1. A concrete structure comprising at least two upright precast concrete plates, wherein
   each of the plates has at least one edge face and the edge faces directly confront each other at a joint,
   one of the edge faces is formed with at least one first groove and one second groove extending at approximately 90° to the first groove and the other of the edge faces is formed with at least one first tongue engaged in the first groove and at least one second tongue engaged in the second groove, whereby the mutually generally perpendicular tongues and grooves inhibit relative movement of the faces in two generally perpendicular directions.

2. The concrete structure according to claim 1, wherein each of the plates has two opposite edges each formed with a respective such edge face, one of the edge faces of each precast concrete plate being provided with the tongues, while the edge face of the opposite edge is provided with grooves.

3. The concrete structure according to claim 1, further comprising:
   a mechanical bolt connection extending at the joint between the precast concrete plates and across the edge faces of the precast concrete plates.

4. The concrete structure according to claim 1, further comprising:
   a mass of adhesive at the joint between the edge faces.

5. The concrete structure according to claim 1, further comprising:
   a mass of grout at the joint between the edge faces.

* * * * *